United States Patent [19]

Slaby

[11] Patent Number: 5,495,987

[45] Date of Patent: Mar. 5, 1996

[54] DEVICE FOR SLICING ENSILAGE FROM A COMPACTED ENSILAGE MASS

[76] Inventor: Kenneth A. Slaby, Rte. 1, Box 224, Whitehall, Wis. 54773

[21] Appl. No.: 246,694

[22] Filed: May 20, 1994

[51] Int. Cl.⁶ .......................... B02C 18/16; B02C 23/00
[52] U.S. Cl. .................. 241/27; 241/28; 241/101.72; 241/101.74; 241/101.77; 241/277; 172/272; 414/724
[58] Field of Search .................... 241/101.7, 189.1, 241/277, 27, 28; 172/272, 273; 299/39; 414/607, 686, 724, 920

[56] References Cited

U.S. PATENT DOCUMENTS

| | | |
|---|---|---|
| 993,640 | 5/1911 | Barnard . |
| 2,605,106 | 7/1952 | Gilmore ........................ 275/6 |
| 2,886,333 | 5/1959 | Harris ........................... 275/3 |
| 3,228,701 | 1/1966 | Smith et al. .................. 275/15 |
| 3,294,262 | 12/1966 | Person ....................... 414/607 X |
| 3,315,381 | 4/1967 | Fisher ........................... 37/24 |
| 3,597,908 | 8/1971 | Schaefer .................... 414/607 X |
| 3,598,263 | 8/1971 | Ehmke ....................... 414/607 X |
| 3,779,408 | 12/1973 | Ivie ......................... 241/101.7 X |
| 3,853,419 | 12/1974 | Bertram et al. ............... 404/121 |
| 3,985,305 | 10/1976 | Williamson et al. ........ 241/277 X |
| 4,157,164 | 6/1979 | Helm et al. ................ 241/101.7 |
| 4,297,073 | 10/1981 | Schmid et al. ........... 241/101.7 X |
| 4,666,360 | 5/1987 | Harms et al. ................ 414/607 |
| 4,838,752 | 6/1989 | Bryant ..................... 414/607 X |

FOREIGN PATENT DOCUMENTS

| | | | |
|---|---|---|---|
| 2648669 | 12/1990 | France ..................... 241/101.7 |
| 0041341 | 5/1981 | United Kingdom ............... 33/14 |

Primary Examiner—Timothy V. Eley
Attorney, Agent, or Firm—M. Paul Hendrickson

[57] ABSTRACT

The present invention provides an ensilage slicing attachment for slicing compacted ensilage. The device is particularly adapted for attachment to a skid steer loader. It is especially useful in an open pit, trench, or bunker silos in which compacted ensilage may be sliced from a vertical compacted facing to produce a forkable product. The attachment typically includes a hydraulically driven reel equipped with flat slicing blades (such as sickle blades) which perpendicularly extend outwardly from the reel. The slicing blades are staggered so as to create uniform and even slicing action. Particularly effective are staggered slicing blades which transversely cut against the ensilage facing at a lateral spacing of about one to about two inches per reel revolution. The skid steer boom serves to sweep the reel along the face while slicing depth may be controlled by forward and backward movement.

18 Claims, 5 Drawing Sheets

DEVICE FOR SLICING ENSILAGE FROM A COMPACTED ENSILAGE MASS

FIELD OF THE INVENTION

The present invention relate to ensilage slicing devices and more particularly to a slicing device for converting compacted ensilage to a consumable ensilage form.

BACKGROUND OF THE INVENTION

Historically, farmers have harvested ensilage crops from their fields and stored the harvested ensilage in large storage units. The harvesting procedure generally entails field chopping the ensilage and blowing or dumping the chopped ensilage into a storage unit such as vertical silos, pit or trench silos. In the case of open trench or pit silos, the ensilage is typically confined between two parallel walls open at one or sometimes both ends. The open ends afford mechanical access for removing the ensilage from the pit or trench. Tractors or skid steer loaders equipped with forked buckets are frequently used to remove compacted ensilage from these pit or trench silos. The current mechanical techniques for removing the ensilage is ineffective and often leads to substantial ensilage spoilage and waste.

Ensilage spoilage and waste is largely due to the ineffectiveness of current equipment in removing only what ensilage is needed while preserving the anaerobic and compacted character of the stored ensilage. As part of the harvesting and storing operations, the ensilage weight compacts the loosely chopped ensilage product into a dense, compacted ensilage mass. The loose and free flowing ensilage stems of the freshly harvested product become extensively intertwined within the mass and thus tenaciously hold the ensilage mass together in a dense, compacted ensilage product. Compacted ensilage of legumous cropping is most difficult to remove from open pits or trench silos since the intertwined stemmings tenaciously bind the ensilage together as a solid and compacted mass. The resultant compacted ensilage cannot be easily removed manually with a conventional manual or mechanical silage fork equipment. The technique of removing the compacted silage from the storage unit typically involves tearing and removing a compacted segment of the silage from the silo or pit.

Preservation of the ensilage in an unspoiled state necessitates maintaining anaerobic conditions. Excessive exposure to air accelerates spoilage. The most common method for removing ensilage from a trench silo (by driving a forked or bucket loader into the trench and lifting or pulling a torn top layer of compacted silage from the silo or pit) fails to preserve the anaerobic conditions. The tearing of intertwined stemmings from the compacted ensilage mass creates a highly irregular, creviced and porous surface. The irregular and porous surface increases the total exposed surface area to air which in turn renders the exposed ensilage susceptible to oxidative deterioration and increased spoilage.

Heretofore, a trench silo unloader known to the trade as a FOX 618 Trench Silo Unloader had been specially made for use in removing ensilage from trench silos. The unloader was relatively effective when used in trench silos filled with corn ensilage. Corn ensilage is, however, easier to remove since it is not as densely intertwined and compacted is as the case for legumous ensilage. The FOX unloader was adapted for a three-point hookup onto relatively large farm tractors. The unloader included a rotating reel fitted with hooked cutters, an auger and blower assembly for blowing the removed ensilage, and means for raising and lowering the rotating reel to the appropriate working level. The reel was driven by a power take-off system supplied by the tractor which also supplies power for hydraulically raising or lowering the reel about a support post or column. Although the Fox Trench Silo unloader worked effectively upon corn ensilage products, the device was not effective when used upon the more compacted and intertwined legumous ensilages such as ensilages of pea, alfalfa, clover, soy beans, etc. The unloader cutters were of a design for hooking, unevenly tearing and pulling ensilage from the compacted ensilage mass. The hooking and tearing mode of operation, when applied to compacted legumous ensilage, creates an uneven and porous surface highly susceptible to spoilage. It is important in any efficient farming operation, however, for such compacted legumous ensilages to be uniformly cut and evenly removed from the exposed vertical face of a compacted ensilage mass without substantially increasing the exposed surface region or altering the compacted character of the exposed surface or sub-surface ensilage.

SUMMARY OF THE INVENTION

The present provides an ensilage slicing device which uniformly slices compacted ensilage into ensilage particles from a compacted ensilage surface without adversely affecting the porosity or compactness of the unsliced regions of the compacted ensilage mass. The present device converts the compacted ensilage into a forkable, consumable and uncompacted ensilage product. The ensilage slicing device comprises:

a) a rotatable reel equipped with a plurality of slicing knives circumferentially positioned about the reel so as to uniformly slice ensilage transversely from a face of a compacted ensilage mass;

b) means for raising and lowering said reel along said face; and c) means for rotationally propelling said reel along said face so as to uniformly slice and transversely remove the ensilage from the face of said compacted ensilage mass.

The slicing knives are preferably of a planer or flat configuration such as a substantially flat surfaced knife equipped with sharpened cutting edges which are aligned upon the reel so as to transversely slice onto a vertical face of compacted ensilage mass. The substantially flat slicing knives are positioned so as to project perpendicularly outwardly from the reel and to inwardly slice directly onto the face of the compacted ensilage product. The slicing action of the knives transversely slices the compacted ensilage along the compacted ensilage face and results in a uniform removal of sliced ensilage from the face to a depth onto which the substantially flat knives interiorly penetrate from the compacted ensilage face. The removed ensilage is provided in the uncompacted and fluffed form.

DETAILED DESCRIPTION OF THE INVENTION

With reference to FIGS. 1–6, the present invention provides an ensilage slicing device (generally referenced as 1) for converting compacted ensilage $S_d$ into a forkable and uncompacted ensilage $S_f$ by substantially uniformly slicing and removing from a vertical face F of the compacted ensilage $S_d$ an uncompacted ensilage $S_f$ mass, said device 1 comprising:

a) a supportive frame (generally referenced as 2) equipped with mounting means (generally referenced as 6) for mounting the frame 2 to a vehicular transport L;

b) a rotatable reel (generally referenced as 10) carried by said frame 2 and equipped with a plurality of slicing knives 11 circumferentially positioned about said reel be so as to uniformly slice a layer of the compacted ensilage $S_d$ from said face F; and c) powering means (generally prefixed by a 20 series enumeration) for rotationally propelling said reel 10 along said face F so as to uniformly cut and remove said uncompacted ensilage mass $S_f$ therefrom.

The device 1 uniformly slices compacted ensilage $S_d$ along a vertical face F without substantially altering the porosity and surface character of the unsliced compacted ensilage $S_d$ interiorly disposed beneath said face F.

Figure 4:
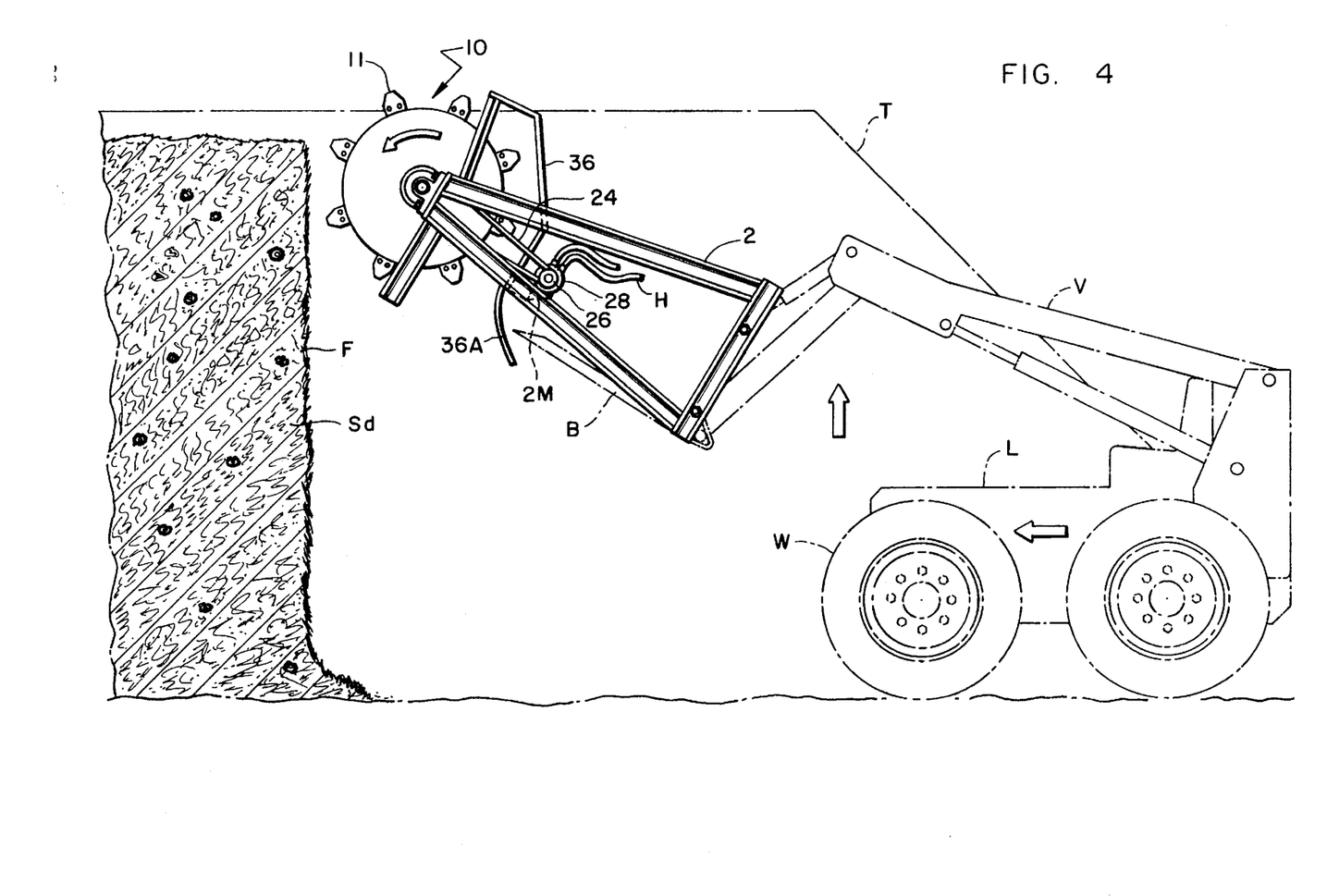
FIG. 4 depicts an operational side view of the device shown in FIG. 1.
Figure 5:
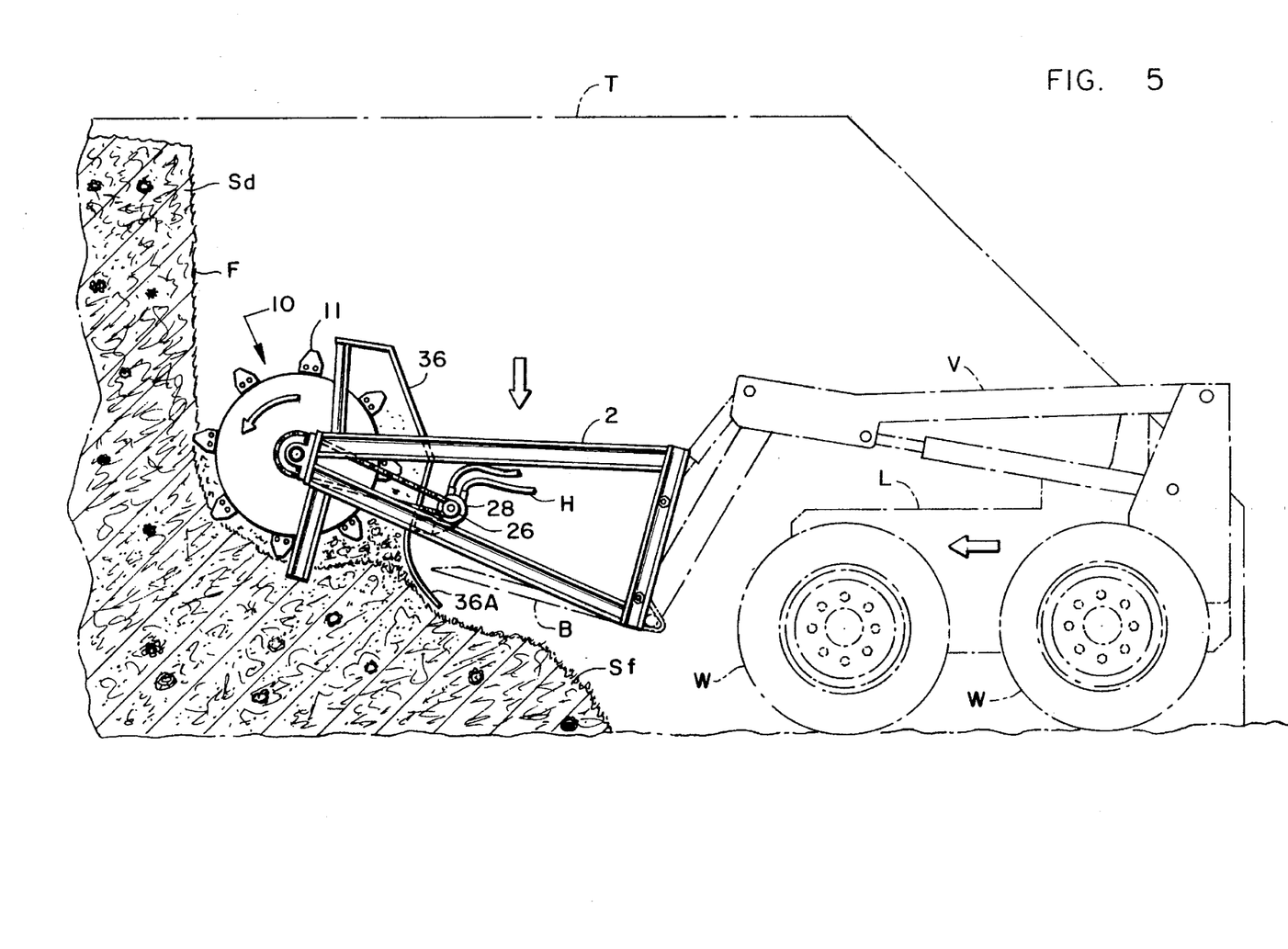
FIG. 5 depicts another operational side view of the device shown in FIG. 4.
Figure 6:
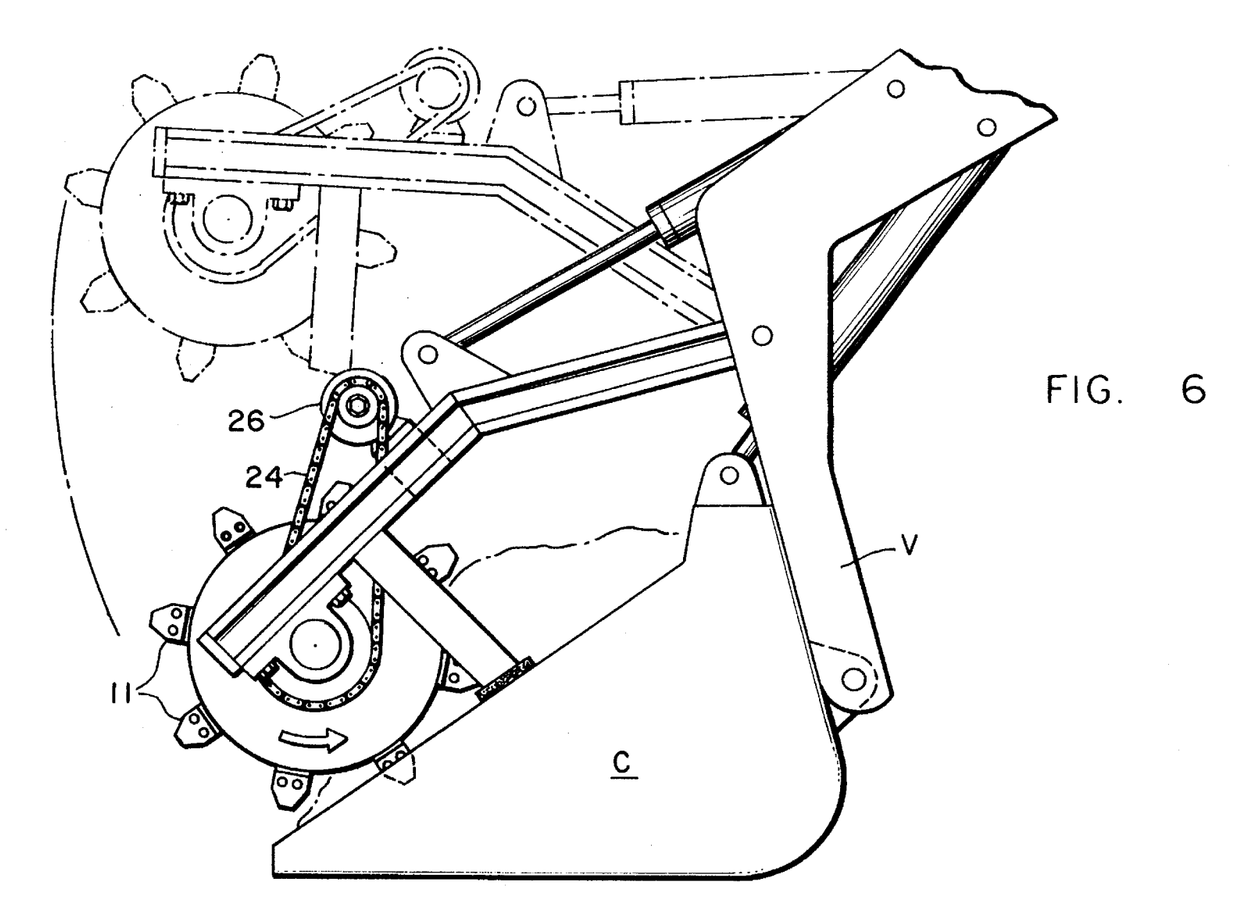
FIG. 6 depicts operational views of the device shown in FIG. 4 further equipped with an ensilage collecting bucket.

The slicing knives 11 when rotated about the face F by reel 10 uniformly penetrate, slice, cut and remove a substantially uniform layer of ensilage from the face F of the compacted ensilage mass $S_d$ as illustrated in FIGS. 4–6. The configuration and positioning of the knives 11 about reel 10 permits knives 11 to transversely slice onto the face F of the compacted ensilage $S_d$. As explained in greater detail, the knives 11 are positioned about reel 10 at staggered intervals that knives 11 progressively slice in a lateral relationship to one another as reel 10 rotates about face F. The lateral slicing action of knives 11, as reel 10 rotates, creates a substantially smooth contoured facial cut F from the compacted ensilage mass $S_d$ without adversely affecting the compacted nature of interiorly disposed and unremoved ensilage mass $S_d$ such as illustrated in FIGS. 4 and 5. The use of substantially flat slicing knives 11 laterally positioned sufficiently close proximity to one another and in a rotationally staggered relationship upon cross bars 19 permits the sliced ensilage to freely fall in a particulated form from face F. The lateral inwardly slicing movement of knives 11 as the slicing knives 11 rotate reel 10 about a rotational axis minimizes tearing and pulling of lengthy and tightly bound ensilage strands or stemmings from the compacted ensilage $S_d$ mass while also alleviating creation of porous fissures or channels extending from face F into the interior of compacted ensilage $S_d$. Unevenness in cutting and a creation of fissures or porous channels into the interior of the compacted ensilage $S_d$ renders the compacted ensilage $S_d$ susceptible to aerobic spoilage. Thus, a uniform and smooth cut about the face F as effectuated by the progressive slicing action of knives 11 can result in a significant reduction in aerobic spoilage of the compacted ensilage mass $S_d$.

A suitable transport (generally referenced as L) for device 1 as depicted in FIGS. 1–5, includes a transport L equipped with an appropriate power source (generally referenced as H) for driving the power means (prefixed by 20 series number) for rotationally propelling reel 10. A variety of different power sources H and drive means 20 may be used to propel reel 10.

The transport L is also suitably equipped with elevational means (generally referenced as V and externally shown as booms) for raising and lowering the reel 10 along the face F and depth adjusting means (e.g. wheeled transport L) for adjusting the depth of cut along the face F of the compacted ensilage mass $S_d$. The device 1 may, if desired, be provided as a self-propelled unit (not shown) equipped with the appropriate power source H to effectively slice and remove the compacted ensilage $S_d$ from the face F. In the preferred embodiments, the device 1 is most appropriately provided as an attachment or accessory unit 1 for attachment and operational use to a conventional skid steer transport L such as depicted in FIGS. 1 and 4–6. As will be observed from the drawings, the device 1 may be operationally hooked onto a conventional skid steer loader L. As normally associated with the operational use of skid steer loaders L, the use of the device 1, in combination with a skid steer loader L, affords exceptional maneuverability and compactness of operation.

The device 1 is shown as being front mounted onto a conventional forked bucket B of skid steer loader L. Mounting of device 1 onto bucket B conventionally equipped with rapid coupling and decoupling system (not shown) for rapidly attaching and detaching bucket B from skid steer loader L will, likewise, permit device 1 to be readily attached or detached from loader L. The front mounting of the device 1 to the skid steer loader L also provides a clear visual sight for the operator onto the work site. As commonly recognized, such skid steer loaders L are also conventionally equipped with powered wheels W for moving the skid steer L to and from a work site, namely in this case, to and from the face F of the compacted ensilage mass $S_d$. The depicted skid steer loader L is also equipped with conventional elevational means (generally referenced as V) shown more particularly as booms V for raising and lowering the device 1 along face F. Typical of conventional skid steer loaders, the depicted loader L is further equipped with a hydraulic power source (generally referenced as H) for attaching the hydraulic hoses H so as to provide hydraulic power for hydraulic motor 26.

The accessory device 1 shown in the Figures includes a supportive frame (generally referenced as 2) for carrying reel 10 and mounting means (generally referenced as 6) for mounting the device 1 onto transport L. The depicted supportive frame 2 includes a pair of opposingly positioned triangular-shaped support brackets (generally referenced as 2L and 2R) of sufficient structural strength to support device 1. Support brackets 2L and 2R are mirror images of one another. The left triangular support bracket 2L includes an upper support rail 2A, and a lower support rail 2B connected together at triangular apex by front rail 2C and at an opposite side by proximate rail 2D. The right triangular support frame 2R similarly includes an upper support rail 2A, a lower support rail 2B, a front rail 2C and rear rail 2D, as may be observed from FIGS. 2 and 3. A supportive cross bar 2E bridging between triangular supports 2L and 2R serves to strengthen supportive frame 2 between reel 10 and bucket B as well as affording an appropriate support for mounting the motor drive means 20 onto frame 2. Cross support rail 2E, accordingly includes a suitable motor mount 2M for mounting the hydraulic motor 26 thereto. Cross bar 2E further serves as a brace for retainingly holding a flexible portion 36A (e.g. heavy rubber) of shield 36 in place. Front rails 2C of triangular support brackets 2L and 2R are each fitted with a pillow block 7 for housing roller bearing races upon which shaft 12 of reel 10 is axially mounted.

Duplicate downwardly extending arms 32 are respectively affixed onto lower support rail B of triangular support brackets 2L and 2R serve as vertical stand for stopping the vertical decline of reel 10 when device 1 is operationally lowered. Each of the upper top rails 2A of triangular support braces 2L and 2R are fitted with a protective shield mount 2P which serves to mount protective shield 36 onto frame 2. The backside of reel 10 includes a protective shield 36 which protects an operator from errant ensilage as it is cut from the compacted mass $S_d$.

The device 1 depicted in the figures includes mounting means 6 for directly mounting device 2 onto a conventional forked bucket B for a skid steer loader L. The depicted mounting means 6 for mounting frame 2 to transport L comprises four bolt mounts 6 which are directly drilled from rails 2D. Two of the bolt mounts are oppositely positioned upon rails 2D of braces 2L and 2R, and mate directly onto mounting bolt holes drilled from each of the sidewalls of bucket B. This permits device 1 to be directly bolted onto sidewalls of bucket B which further serves to structurally strengthen the rearward portion of device 1.

With reference to the Figures, the ensilage slicing device 1 of this invention includes a reel 10 axially mounted to frame 2 and equipped with planer protruding knives 11. Reel 10 includes a left outer circular support plate 14, and right outer circular support plate 16 and a centrally disposed circular support plate 18. Eight peripheral support bars 19 butt-welded onto the inside peripheral margins of the left 14 and right 16 circular plates and center plate 18 contribute structural support to reel 10 while also serving as mounting sites for mounting slicing knives 11 onto reel 10. In the depicted figures, eight cross bars 19 are equidistantly spaced about the perimeter of reel 10. Bars 19 are centered apart at a 45° (radial degrees) from one another along the outer perimeter of plates 14, 16, and 18. The middle plate 18 has eight rectangular beds cut to a depth and width which allows the top surface of each cross bar 19 to rest flushly about the outer perimeter of the center plate 18. Similarly, bars 19 are positionally butt-welded to outer plates 16 and 18 so as to chord upon the outer circumference of plates 16 and 18. The positioning of bars 19 and knives 11 upon reel 10 will advantageously afford a rotationally balanced reel 10, which in turn, improves upon slicing efficacy while also reduces wear and tear upon device 1. Reel 10 will advantageously include at least three cross bars 19 and less than twelve and preferably include from about six to about ten cross bars 19.

A steel shaft 12 extending through the longitudinal center of reel 10 and securely welded onto left outer plate 14, right outer plate 16 and center support plate 18 contributes reinforcement to reel 10 while also providing a means for axially mounting reel 10 to journal box 7 of frame 2.

Figure 1:
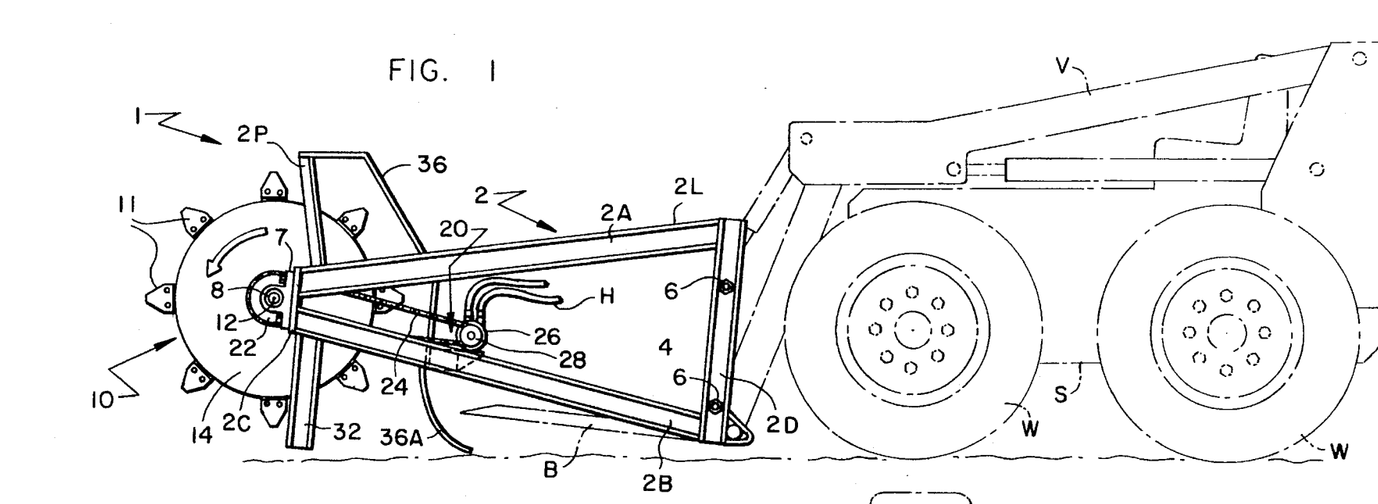
FIG. 1 depicts a side view of the ensilage slicing device mounted onto a transporting vehicle.
Figure 2:
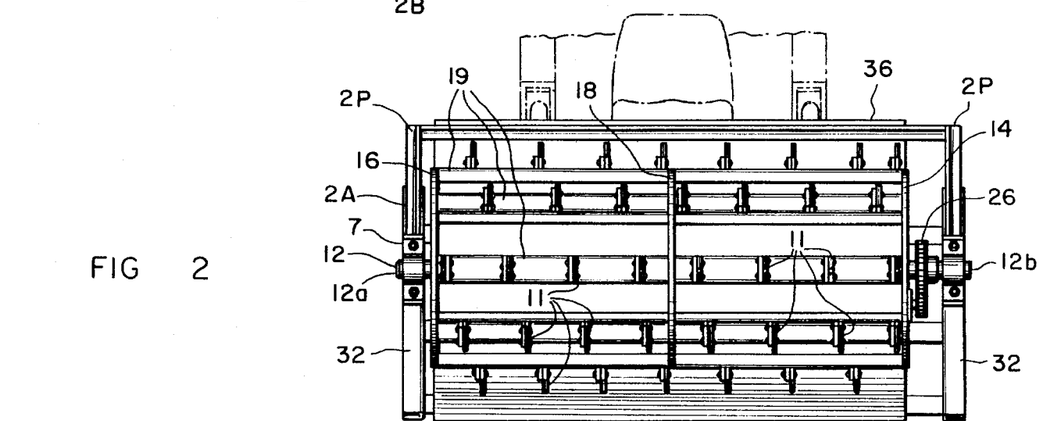
FIG. 2 depicts a frontal view of the device shown in FIG. 1.
Figure 3:
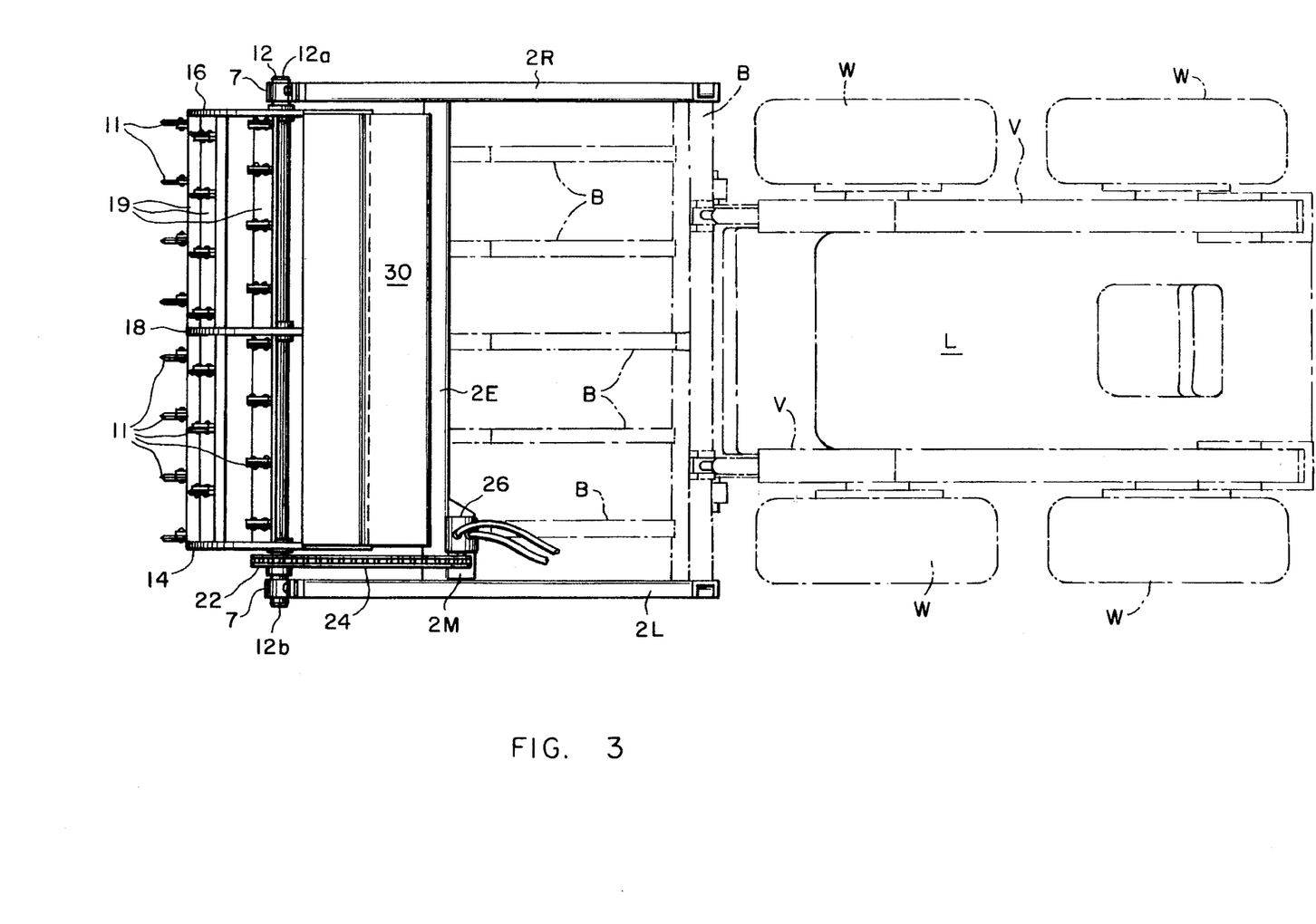
FIG. 3 is a top view of the device shown in FIG. 1.

The number of cross bars, the number of slicing knives and the lateral alignment of knives 11 upon bars 19 should be sufficient so as to allow knives 11 to substantially uniformly slice into face F as reel 10 rotates about shaft 12. The lateral placement of knives 11 about reel 10 should be sufficiently close to one another to permit slicing of the compacted ensilage $S_d$ stemmings into an uncompacted and flowable ensilage mass $S_f$. The slicing blades 11 may be appropriately staggered in such a manner that the rotation of reel 10 will effectuate a lateral slicing movement of subsequent cuts across the face F of the compacted silage $S_d$. This may be accomplished, as illustrated in FIG. 2, by staggering or off-setting each successive row of sickle blades 11 for any given bar 19 from the proceeding alignment of blades 11 upon cross bars 19 so as to provide more uniform slicing action against the vertical face F as reel 10 rotates upon the face F of the compacted ensilage mass $S_d$.

With respect to the depicted device 1, each of the depicted eight cross bars 19 is fitted with a row of triangular shaped sickle blades 11 directly bolted to bars and laterally spaced apart from one another upon each bar 19 at a distance of approximately 8 inches. Typically the lateral placement of the slicing knives upon each bar will be about 12 inches or less and advantageously less than about 10 inches. A tighter rotational lateral positioning of the blades 11 (e.g. one inch or less) will perform satisfactory but generally serves no further advantage over those laterally positioned from about one to about two inches apart from one another. The knives 11 are shown as being staggered upon bars 19 so that upon rotational movement, each successive bar 19 rotationally moving onto face F will laterally shift the slicing action against face F by a factor of about one (1) inch. The off-setting of slicing blades is advantageously positionally aligned in such a manner so that the next succeeding slicing action of slicing blade will be less than about 4 lateral inches and typically less than about 3 lateral inches. Preferably, the slicing blades are staggered so that as the reel 10 rotates, the next successive row of sickle blades 11 upon bars 19 slicing against face F will be less than about 2 inches and preferably at about one inch apart. Preferably, each successive bar 19 in the rotational movement of reel 10 shifts the slicing action about one inch (1"). Consequently, in one revolution of reel 10, knives 11 will have swept across ensilage face F while creating a one inch lateral slicing activity along face F for each revolution of reel 10. Advantageously knives 11 will be provided in sufficient number and lateral positioning about reel 10 to cause a substantially uniform slicing action about face F so that less than about four inches (4") of lateral slicing upon face F for each revolution of reel 10 occurs, with less than about three inches and preferably less than about two inches of lateral slicing for each revolution of reel 10 about face F providing for more effective ensilage removal than a wider lateral displacement of knives 11. Placement of a sufficient number of knives 11 upon a sufficient number of bars 19 to effectuate about a one inch slicing action or less upon face F for each revolution of reel 10 provides a particularly effective slicing action.

In the depicted device 1, four outer slicing blades 11a are mounted (e.g. by bolting) onto the left support plate 14 and the right support plate 16. These outside mounted slicing blades 11a provide a smoother edge cut at the reel 10 ends.

The figures depict in detail a suitable power means (generally referenced as 20) for axially rotating and powering shaft 12. Shaft 12 is fitted with drive gear 22 driven by a drive chain 24 which is in turn powered by power gear 28 of hydraulic motor 26. The hydraulic motor 26 is adapted for operational connection to a suitable hydraulic source such as conventionally provided the illustrated skid steer loader L.

FIGS. 4 and 5 depict a cross-sectional view of a trench silo partially filled with compacted ensilage $S_d$, and the device 1 being used to slice ensilage from a face F of compacted ensilage $S_d$. Skid steer vehicle L provides an appropriate vehicular means W (wheels) for bringing reel 10 in contact with a vertical face (F) of compacted ensilage $S_d$. In operational use as depicted in FIGS. 4 and 5, the operator drives the skid steer loader L to the vertical face F of the compacted ensilage mass $S_d$, engages the hydraulic motor 26 (which illustratively drives the reel 10 at about 300 rpm per minute) which, when properly positioned, will slice uncompacted ensilage $S_f$ typically uniformly remove or facial layer of about 2 to about 8 inches from vertical face F of compacted ensilage mass $S_d$. Uniform removal of the sliced and uncompacted ensilage $S_f$ from face F may be effectively accomplished by raising and lowering booms V while rotating the slicing reel 10 along the vertical face F of the compacted ensilage $S_d$. The knives 11 and 11a slice the intertwined stemmings from the compacted ensilage $S_d$ into a free flowing mass $S_f$ which gravitationally falls from face F onto the floor or ground as illustrated by FIG. 5. The removed, uncompacted or free-flowing sliced ensilage $S_f$ is of a substantially lesser density than the compacted ensilage mass $S_d$. The ensilage processed by this device is similar in physical character to freshly harvested ensilage crop (which unlike the compacted ensilage mass $S_d$) in that it may be easily forked and moved about with a standard ensilage fork. A conventional loader bucket may then be effectively used to scoop and transport ensilage $S_f$ to the animal feed site.

The cutting and slicing edges of knives 11 are positioned upon reel 10 so that the knives transversely slice and cut through the face F of the compacted ensilage mass $S_d$. The knives 11, accordingly, slice the compacted ensilage $S_d$ along a slicing path transverse to a circumferential rotational plane formed by the rotation of reel 10. The cutting and slicing action of knives 11 will be aligned along a plane transversely disposed to the face F of the compacted ensilage mass $S_d$. In the preferred embodiments of the invention, knives 11 will consist essentially of a planer blade of a substantial linear configuration and of a substantially planer cutting edge which as slicing knives 11 individually project outwardly and transversely to the outer circumferential periphery of reel 10. Most preferably, the substantially flat knives 11 are positioned about the outer periphery of reel 10 in a substantially perpendicular relationship to reel 10 as shown in the drawings.

As may be observed from the Figures, the sickle knives 11 and 11a operationally slice through the ensilage face F up to a sickle blade depth which, for a standard sickle knife, amounts to about 2½ inches in depth. As mentioned above, the knives 11 upon bars 19 are staggered in relationship to the proceeding row of knives 11 so that each successive rotational bar 19 pass results in commutating (slicing) the compacted ensilage along the face (F) to a fluffy and smaller ensilage particle size. Because of the effectiveness of the device 1, a relatively small power supply is needed as a power source. In operation, the device 1 uniformly slices and gravitationally removes free flowing sliced particles $S_f$ from the face of the compacted ensilage mass $S_d$. Since aeration and oxidation are a major cause of ensilage spoilage, the mechanism whereby the present device 1 evenly and uniformly removes surface ensilage from a face F without substantially altering the desired compacted nature of the remaining unsliced or unremoved face, substantial reductions in ensilage spoilage may be realized through the utilization of the present device 1. The device 1 is particularly effective when used to commutate densely packed legumous masses to a more free flowing and consumable ensilage form.

FIG. 6 illustrates the tandem use of device 1 and a collecting bucket C to simultaneously collect the sliced ensilage $S_f$ as it is removed from face F of the compacted ensilage mass $S_d$. Both the device 1 and collecting bucket C may be mounted and carried by a conventional transport power source L. As shown in FIG. 6, the collecting bucket C is separately carried by hydraulic boom V while device 1 operates from boom V as described herein before. The phantom lined portion of FIG. 6 depicts reel 10 in a suitable positioning for slicing onto face F as shown in FIG. 4 while the solid line reel 10 depiction of FIG. 6 depicts reel 10 in a similar positioning stage as illustrated in FIG. 5. The tandem combination of device 1 and collecting bucket C allows the ensilage removal $S_f$ from face F and collection thereof to be conducted in a single stage operation. The removed $S_f$ simply falls into collecting bucket C which then may be directly transported to the desired feeding site.

What is claimed is:

1. A method for providing an uncompacted and free flowing ensilage product from a compacted ensilage mass with an ensilage slicing attachment comprising a rotatable reel equipped with a plurality of slicing knives circumferentially positioned about the reel so as to uniformly slice ensilage transversely from a vertical face of the compacted ensilage, mounting means for mounting the attachment to a boom assembly of a skid steer loader, and rotational means for rotationally propelling said reel along said face so as to uniformly slice and transversely remove ensilage stemmings from the face of said compacted ensilage mass, said method comprising:

a) attaching the attachment to the boom assembly of the skid steer loader equipped with elevational means for positioning said reel along said face, a power source for rotationally propelling the reel, and mobile means regulating a slicing depth of the slicing knives along the face;

b) operationally positioning the rotatable reel along the face of the compacted ensilage mass so as to permit the slicing knives to transversely penetrate said face; and c) sweeping, while rotationally propelling the reel, the operationally positioned reel along said face so as to transversely slice and uniformly remove the free flowing ensilage product from the face of the compacted ensilage mass.

2. The method according to claim 1 wherein the method includes sweeping and rotationally propelling the reel along the face of a compacted hay ensilage mass.

3. The method according to claim 1 which includes sweeping the operationally positioned reel along the face of compacted legumous ensilage.

4. The method according to claim 1 which includes the step of attaching the attachment to a hydraulic power source and a hydraulic driven motor for powering said reel.

5. The method according to claim 4 which includes operationally positioning the reel along the face of compacted leguminous ensilage housed within a structure open to accessing thereto with said skid steer.

6. An ensilage slicing attachment for uniformly slicing and removing an uncompacted and free flowing ensilage product from a vertical face of a compacted ensilage mass when the attachment is mounted onto a boom assembly of a skid steer loader equipped with a power source for powering the attachment, said attachment comprising:

a) a supportive frame equipped with mounting means for mounting the frame to the boom assembly of the skid steer loader;

b) a rotatable reel carried by said frame and equipped with a plurality of slicing knives tangentially projecting outwardly in a substantially perpendicular relationship to a rotational periphery generated by rotationally propelling said reel and circumferentially positioned about said reel so as to transversely slice the uncompacted ensilage product from said face;

c) powering means for rotationally propelling said reel along said face so as to uniformly slice and remove said uncompacted ensilage product therefrom.

7. The attachment according to claim 1 wherein the reel includes a plurality of cross bars circumferentially extending along a longitudinal axis of said reel.

8. The attachment according to claim 7 wherein the cross bars include a plurality of the slicing knives individually equipped with a planer slicing edge aligned in a substantially perpendicular relationship to said cross bars.

9. The attachment according to claim 8 wherein the slicing knives are positioned upon the cross bars in a staggered spatial arrangement.

10. The attachment according to claim 7 wherein said slicing knives are spatially aligned upon said cross bars so to create upon each rotation of the reel a lateral slicing action by said knives ranging from about one inch to about two inches.

11. The attachment according to claim 6 wherein the attachment includes a number of cross bars radially positioned about the reel so as to provide a rotationally balanced reel upon rotational movement of said reel.

12. The attachment according to claim 11 wherein the slicing knives are aligned upon said cross bars so as to create a substantially uniform lateral slicing action against the face which action measures less than three inches for each revolution of the reel.

13. The attachment according to claim 11 wherein the knives are positioned upon said cross bars so as to create upon each rotational movement of the reel, a lateral slicing action onto the face measuring at a lateral distance ranging from about one inch to about two inches.

14. An ensilage slicing combination adapted to provide an uncompacted and free flowing ensilage product by uniformly slicing said product from a vertical face of a compacted ensilage mass, said combination comprising:

A) a skid steer loader equipped with:
  a) attaching means for attaching and detaching a slicing attachment to a boom assembly of the skid steer loader;
  b) elevational means for positioning the attachment along the vertical face of the compacted ensilage mass with said boom assembly;
  c) mobile means for regulating slicing depth along the face; and
  d) a hydraulic power source for powering the attachment; and B) the attachment includes:
  a) a supportive frame equipped with coupling means for mounting the frame to the attaching means;
  b) a rotatable reel carried by said frame and equipped with a plurality of slicing knives tangentially projecting outwardly in a substantially perpendicular relationship to a rotational periphery generated by rotationally propelling said reel and circumferentially positioned about said reel so as to transversely slice from said face a uniform layer of uncompacted ensilage therefrom; and
  c) reel powering means connected to said power source for rotationally propelling said reel along said face.

15. The combination according to claim 14 wherein the reel includes a plurality of cross bars circumferentially extending along a longitudinal axis of said reel, the cross bars include the plurality of the slicing knives individually equipped with a planer slicing edge aligned in a substantially perpendicular relationship to said cross bars, and the slicing knives are positioned in a staggered spatial arrangement upon said cross bars so as to create upon each rotation of the reel a lateral slicing action by said knives ranging from about one inch to about two inches.

16. The combination according to claim 14 wherein the slicing knives are spatially arranged about the reel so as to create upon each rotation of the reel a lateral slicing action by said knives ranging from about one inch to about 3 inches.

17. The combination according to claim 16 wherein the attachment is equipped with a hydraulic motor for operational connection to the hydraulic power source and thereby provide the powering means for rotationally propelling the reel about the face.

18. The combination according to claim 17 wherein the combination includes a collection bucket for collecting the uncompacted ensilage sliced from said face.

* * * * *